United States Patent
Xu

(10) Patent No.: US 12,479,478 B2
(45) Date of Patent: Nov. 25, 2025

(54) METHOD AND APPARATUS FOR CONTROLLING VEHICLE DRIVING MODE SWITCHING

(71) Applicant: Shenzhen Yinwang Intelligent Technologies Co., LTD., Guangdong (CN)

(72) Inventor: Lingfeng Xu, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 18/157,617

(22) Filed: Jan. 20, 2023

(65) Prior Publication Data
US 2023/0159062 A1 May 25, 2023

Related U.S. Application Data

(63) Continuation of application No. PCT/CN2020/103818, filed on Jul. 23, 2020.

(51) Int. Cl.
*B60W 60/00* (2020.01)
*B60W 40/06* (2012.01)
*B60W 50/14* (2020.01)

(52) U.S. Cl.
CPC ........ *B60W 60/0059* (2020.02); *B60W 40/06* (2013.01); *B60W 50/14* (2013.01); *B60W 60/0053* (2020.02)

(58) Field of Classification Search
CPC ......... B60W 60/0059; B60W 60/0053; B60W 60/0061; B60W 40/06; B60W 50/14; B60W 2556/65
See application file for complete search history.

(56) References Cited

U.S. PATENT DOCUMENTS

2015/0314780 A1    11/2015   Stenneth et al.
2017/0028987 A1*   2/2017   Yamada ............... B60N 2/0022
(Continued)

FOREIGN PATENT DOCUMENTS

CN     104064050 A    9/2014
CN     104837705 A    8/2015
(Continued)

OTHER PUBLICATIONS

Wu Chao-zhong et al., Review of control switch and safety of human-computer driving intelligent vehicle, Journal of Traffic and Transportation Engineering, Dec. 2018, with an English abstract total 11 pages.

*Primary Examiner* — Russell Frejd
(74) *Attorney, Agent, or Firm* — WOMBLE BOND DICKINSON (US) LLP

(57) ABSTRACT

A method includes: obtaining environment information detected by a second vehicle, where the second vehicle is a vehicle traveling in a target road section, and the target road section is a road section located in front of a traveling direction of a first vehicle; predicting, based on the environment information detected by the second vehicle, whether the target road section is suitable for automated driving; and if the target road section is unsuitable for automated driving and the first vehicle is currently in an automated driving mode, reminding a driver of the first vehicle to take over a driving control right of the first vehicle, so that the first vehicle is switched from the automated driving mode to a manual driving mode.

9 Claims, 8 Drawing Sheets

(56) References Cited

U.S. PATENT DOCUMENTS

| | | | |
|---|---|---|---|
| 2017/0168483 A1 | 6/2017 | Knorr et al. | |
| 2017/0259820 A1 | 9/2017 | Takahashi | |
| 2017/0297587 A1* | 10/2017 | Mimura | B60W 30/182 |
| 2018/0037223 A1* | 2/2018 | Goto | G05D 1/0231 |
| 2018/0105184 A1 | 4/2018 | Urano et al. | |
| 2018/0151066 A1* | 5/2018 | Oba | G05D 1/247 |
| 2018/0284759 A1* | 10/2018 | Michalakis | B60W 60/0059 |
| 2019/0049941 A1* | 2/2019 | Michalakis | B60W 60/0059 |
| 2020/0180639 A1* | 6/2020 | Mizoguchi | B60W 60/001 |
| 2021/0309246 A1* | 10/2021 | Sugano | B60W 40/08 |
| 2023/0159061 A1* | 5/2023 | Fritz | B60W 60/0059 |
| | | | 701/23 |

FOREIGN PATENT DOCUMENTS

| | | |
|---|---|---|
| CN | 106080606 A | 11/2016 |
| CN | 107571864 A | 1/2018 |
| CN | 107943046 A | 4/2018 |
| CN | 108873694 A | 11/2018 |
| CN | 109878511 A | 6/2019 |
| CN | 110264720 A | 9/2019 |
| CN | 110312914 A | 10/2019 |
| CN | 110341721 A | 10/2019 |
| CN | 110775069 A | 2/2020 |
| CN | 110834638 A | 2/2020 |
| CN | 110884500 A | 3/2020 |
| CN | 110920619 A | 3/2020 |
| EP | 2915718 A1 | 9/2015 |
| EP | 3560785 A1 | 10/2019 |
| JP | 2000259982 A | 9/2000 |
| JP | 2011131838 A | 7/2011 |
| JP | 2019101453 A | 6/2019 |
| WO | 2016068273 A1 | 5/2016 |

\* cited by examiner

METHOD AND APPARATUS FOR CONTROLLING VEHICLE DRIVING MODE SWITCHING

CROSS-REFERENCE TO RELATED APPLICATIONS

This application is a continuation of International Application No. PCT/CN2020/103818, filed on Jul. 23, 2020, the disclosure of which is hereby incorporated by reference in its entirety.

TECHNICAL FIELD

This application relates to the field of automated driving, furthermore, to a method and an apparatus for controlling vehicle driving mode switching.

BACKGROUND

Artificial intelligence (AI) is a theory, a method, a technology, and an application system that use a digital computer or a machine controlled by a digital computer to simulate, extend, and expand human intelligence, perceive an environment, obtain knowledge, and use the knowledge to obtain a best result. In other words, artificial intelligence is a branch of computer science that seeks to understand essence of intelligence and produce a new intelligent machine that can react in a similar way to human intelligence. Artificial intelligence is to research design principles and implementation methods of various intelligent machines, to make the machines have functions of perception, reasoning, and decision-making. Research in the artificial intelligence field includes robotics, natural language processing, computer vision, decision-making and reasoning, human-computer interaction, recommendation and search, AI basic theories, and the like.

Automated driving is a mainstream application in the field of artificial intelligence. An automated driving technology depends on computer vision, a radar, a monitoring apparatus, a global positioning system, and the like to collaborate with each other, to implement automated driving of a motor vehicle without human intervention. Automated driving vehicles use various computing systems to help transport passengers from one location to another. Some automated driving vehicles may require some initial inputs or continuous inputs from an operator (for example, a pilot, a driver, or a passenger). Automated driving vehicles allow an operator to switch from a manual operation mode to an automated driving mode or operate in a mode between the two modes. The automated driving technology does not require a person to drive a motor vehicle, so that theoretically, a driving mistake of the person can be effectively avoided, occurrence of traffic accidents can be reduced, and transport efficiency of roads can be improved. Therefore, the automated driving technology attracts increasing attention.

At present, at a level lower than a level L4 of automated driving SAE, a manual takeover or area-based manual driving is still a basic requirement of automated driving. Only real-time detection information of a current vehicle is usually considered in the existing automated driving technology. When detecting that a dangerous situation exists in a range in front of the current vehicle, the current vehicle forcibly requires a driver to urgently take over the vehicle. Actually, however, the driver is more easily distracted during automated driving. During a manual takeover, it takes time (10 seconds or even 30 seconds on average) to recover cognition, and a risk is more likely to occur during the takeover. Accidents caused during transfer of a control right account for more than 20% of all accidents of automated driving vehicles. Accidents are more likely to occur during switching of a control right due to sudden changes such as road obstructions and agglomerate fogs (more likely to occur in western mountainous areas).

Therefore, how to improve safety of automated driving is a technical issue to be urgently resolved.

SUMMARY

This application provides a method and an apparatus for controlling vehicle driving mode switching, to improve safety of automated driving.

According to a first aspect, a method for controlling vehicle driving mode switching is provided. The method includes: obtaining environment information detected by a second vehicle, where the second vehicle is a vehicle traveling in a target road section, and the target road section is a road section located in front of a traveling direction of a first vehicle; predicting, based on the environment information detected by the second vehicle, whether the target road section is suitable for automated driving; and if the target road section is unsuitable for automated driving and the first vehicle is currently in an automated driving mode, reminding a driver of the first vehicle to take over a driving control right of the first vehicle, so that the first vehicle is switched from the automated driving mode to a manual driving mode.

In some embodiments, if the target road section is unsuitable for automated driving and the first vehicle is currently in the automated driving mode, the driver of the first vehicle may be reminded to get ready to take over or directly take over the driving control right of the first vehicle.

In some embodiments, if the target road section is unsuitable for automated driving and the first vehicle is currently in the automated driving mode, the driver of the first vehicle may be alternatively forced to take over the driving control right of the first vehicle, to improve a sense of urgency of the driver and improve safety of automated driving.

In this embodiment of this application, the environment information detected by the second vehicle in the target road section in front of the traveling direction of the first vehicle is obtained; whether the target road section is suitable for automated driving is predicted based on the environment information; and if the target road section is unsuitable for automated driving and the first vehicle is currently in the automated driving mode, the driver of the first vehicle may be reminded to take over the driving control right of the first vehicle. In this way, in a traveling process, the automated driving vehicle can learn in advance whether the target road section ahead is suitable for automated driving. Therefore, a real-time requirement of a manual takeover during automated driving is effectively reduced, the takeover requirement is changed from a current second level to a minute level, and a specific time is provided for the driver to recover cognition before the takeover, thereby improving safety of automated driving.

With reference to the first aspect, in some implementations of the first aspect, if the target road section is unsuitable for automated driving and the first vehicle is currently in the manual driving mode, the method further includes: reminding the driver of the first vehicle not to switch to the automated driving mode; or notifying the first vehicle that switching from the manual driving mode to the automated driving mode is prohibited.

In this embodiment of this application, if the target road section is unsuitable for automated driving and the first vehicle is currently in the manual driving mode, the driver of the first vehicle may be reminded not to switch to the automated driving mode, or the first vehicle may be notified that switching from the manual driving mode to the automated driving mode is prohibited. This effectively avoids frequent switching between driving modes in the traveling process of the vehicle, thereby ensuring continuity of automated driving and experience of the driver.

With reference to the first aspect, in some implementations of the first aspect, the method further includes: generating an automated driving environment map, where the automated driving environment map is used to indicate whether a plurality of road sections located in front of the traveling direction of the first vehicle are suitable for automated driving, and the plurality of road sections include the target road section.

In this embodiment of this application, the automated driving environment map is generated, so that the driver can learn, in advance based on the automated driving environment map, whether the plurality of road sections in front of the traveling direction are suitable for automated driving, and then the driver can enter a preparation state or perform path planning in advance, thereby improving safety of automated driving.

With reference to the first aspect, in some implementations of the first aspect, the method further includes: obtaining driving mode change information of the second vehicle, where the driving mode change information includes a changed driving mode and a change reason; and the predicting, based on the environment information detected by the second vehicle, whether the target road section is suitable for automated driving includes: predicting, based on the environment information detected by the second vehicle and the driving mode change information of the second vehicle, whether the target road section is suitable for automated driving.

In this embodiment of this application, whether the target road section is suitable for automated driving is predicted based on the environment information detected by the second vehicle and the driving mode change information of the second vehicle, so that an actual situation is fully considered in a prediction process, thereby improving accuracy of a prediction result and safety of automated driving.

According to a second aspect, an apparatus for controlling vehicle driving mode switching is provided. The apparatus includes an obtaining module and a processing module. The obtaining module is configured to obtain environment information detected by a second vehicle, where the second vehicle is a vehicle traveling in a target road section, and the target road section is a road section located in front of a traveling direction of a first vehicle. The processing module is configured to: predict, based on the environment information detected by the second vehicle, whether the target road section is suitable for automated driving; and if the target road section is unsuitable for automated driving and the first vehicle is currently in an automated driving mode, remind a driver of the first vehicle to take over a driving control right of the first vehicle, so that the first vehicle is switched from the automated driving mode to a manual driving mode.

With reference to the second aspect, in some implementations of the second aspect, if the target road section is unsuitable for automated driving and the first vehicle is currently in the manual driving mode, the processing module is further configured to: remind the driver of the first vehicle not to switch to the automated driving mode; or notify the first vehicle that switching from the manual driving mode to the automated driving mode is prohibited.

With reference to the second aspect, in some implementations of the second aspect, the processing module is further configured to generate an automated driving environment map, where the automated driving environment map is used to indicate whether a plurality of road sections located in front of the traveling direction of the first vehicle are suitable for automated driving, and the plurality of road sections include the target road section.

With reference to the second aspect, in some implementations of the second aspect, the obtaining module is further configured to obtain driving mode change information of the second vehicle, where the driving mode change information includes a changed driving mode and a change reason. The processing module is further configured to predict, based on the environment information detected by the second vehicle and the driving mode change information of the second vehicle, whether the target road section is suitable for automated driving.

According to a third aspect, an apparatus is provided. The apparatus includes a storage medium and a central processing unit. The storage medium may be a non-volatile storage medium, and the storage medium stores a computer executable program. The central processing unit is connected to the non-volatile storage medium, and executes the computer executable program to implement the method according to any one of the first aspect or the possible implementations of the first aspect.

According to a fourth aspect, an automated driving vehicle is provided, including the apparatus according to any one of the second aspect or the possible implementations of the second aspect.

According to a fifth aspect, a computer program product including instructions is provided. When the computer program product runs on a computer, the computer is enabled to perform the method according to any one of the first aspect or the implementations of the first aspect.

According to a sixth aspect, a computer-readable storage medium is provided. The computer-readable medium stores program code for execution by a device, and the program code includes instructions used to perform the method according to any one of the first aspect or the possible implementations of the first aspect.

According to a seventh aspect, a chip is provided. The chip includes a processor and a data interface. The processor reads, through the data interface, instructions stored in a memory, to perform the method according to any one of the first aspect or the possible implementations of the first aspect.

In some embodiments, in an implementation, the chip may further include a memory. The memory stores instructions, and the processor is configured to execute the instructions stored in the memory. When the instructions are being executed, the processor is configured to perform the method in any one of the first aspect or the implementations of the first aspect.

DESCRIPTION OF EMBODIMENTS

The following describes technical solutions of this application with reference to the accompanying drawings.

Figure 1:
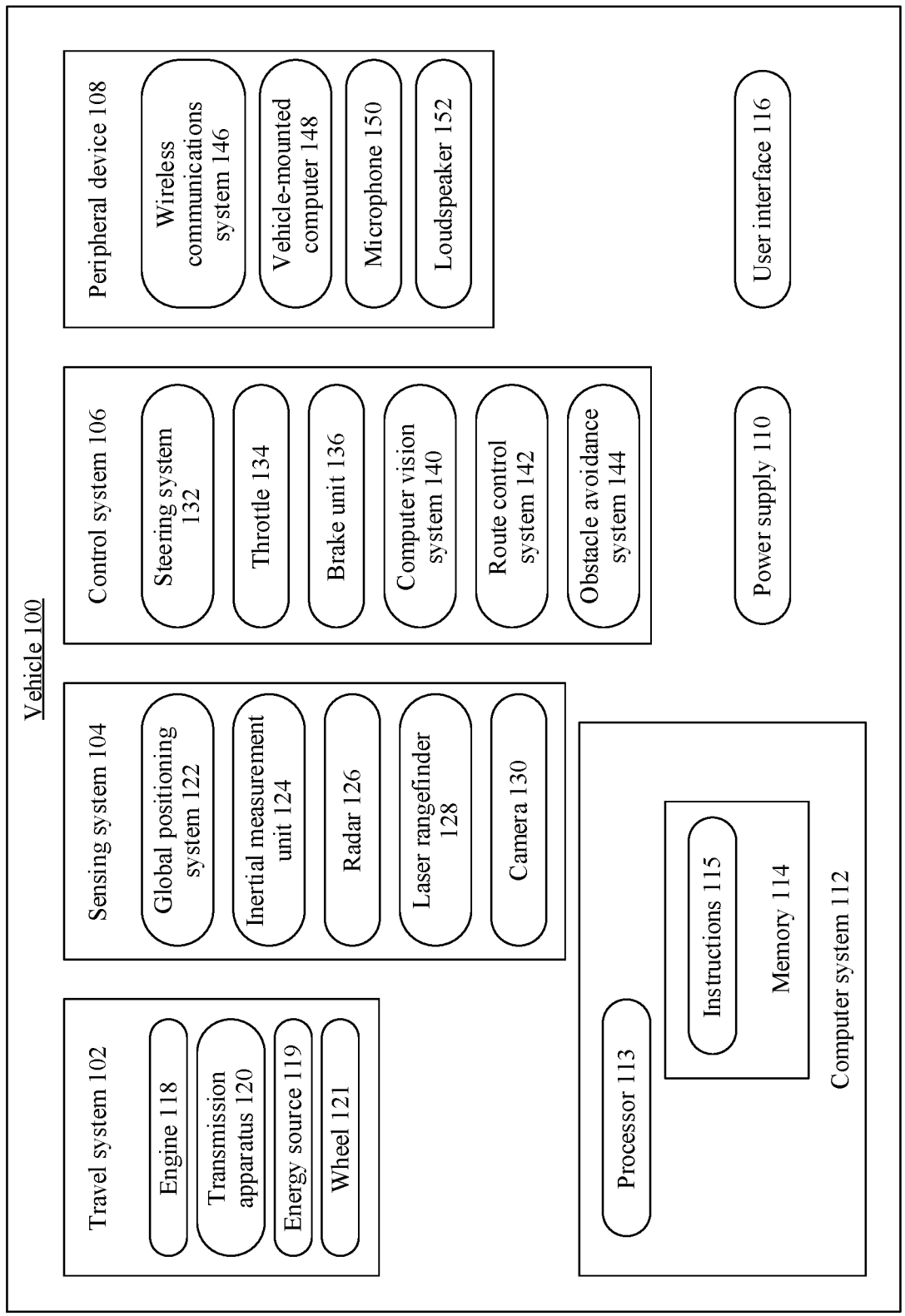
FIG. 1 is a block diagram of functions of a vehicle according to an embodiment of this application.

FIG. 1 is a block diagram of functions of a vehicle 100 according to an embodiment of this application. In an embodiment, the vehicle 100 is configured in a fully or partially automated driving mode.

For example, the vehicle 100 can control itself when in an automated driving mode, and through manual operations, can determine current statuses of the vehicle and a surrounding environment of the vehicle, determine possible behavior of at least one another vehicle in the surrounding environment, determine a confidence level corresponding to a possibility that the another vehicle performs the possible behavior, and control the vehicle 100 based on the determined information. When the vehicle 100 is in the automated driving mode, the vehicle 100 may be set to operate without interaction with a person.

The vehicle 100 may include various subsystems, such as a travel system 102, a sensor system 104, a control system 106, one or more peripheral devices 108, a power supply 110, a computer system 112, and a user interface 116. In some embodiments, the vehicle 100 may include more or fewer subsystems, and each subsystem may include a plurality of elements. In addition, the subsystems and the elements of the vehicle 100 may be interconnected in a wired or wireless manner.

The travel system 102 may include components that provide kinetic motion for the vehicle 100. In an embodiment, the travel system 102 may include an engine 118, an energy source 119, a transmission apparatus 120, and a wheel/tire 121. The engine 118 may be a combination of an internal combustion engine, a motor, an air compression engine, or another type of engine, for example, a hybrid engine formed by a gasoline engine and a motor, or a hybrid engine formed by an internal combustion engine and an air compression engine. The engine 118 converts the energy source 119 into mechanical energy.

For example, the energy source 119 includes gasoline, diesel, another oil-based fuel, propane, another compressed-gas-based fuel, anhydrous alcohol, a solar panel, a battery, and another power source. The energy source 119 may also provide energy for another system of the vehicle 100.

The transmission apparatus 120 may transmit the mechanical power from the engine 118 to the wheel 121. The transmission apparatus 120 may include a gearbox, a differential gear, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about the surrounding environment of the vehicle 100. For example, the sensor system 104 may include a positioning system 122 (the positioning system may be a global positioning system (GPS), or may be a BeiDou system or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) of an internal system of the monitored vehicle 100. Sensor data from one or more of these sensors may be used to detect an object and corresponding characteristics (a location, a shape, a direction, a speed, and the like) of the object. Such detection and identification are key functions of a safe operation of the autonomous vehicle 100.

The positioning system 122 may be configured to estimate a geographical location of the vehicle 100. The IMU 124 is configured to sense changes in a location and an orientation of the vehicle 100 based on an inertial acceleration. In an embodiment, the IMU 124 may be a combination of an accelerometer and a gyroscope.

The radar 126 may use a radio signal to sense an object in the surrounding environment of the vehicle 100. In some embodiments, in addition to sensing the object, the radar 126 may be further configured to sense a speed and/or an advancing direction of the object.

The laser rangefinder 128 may use laser light to sense an object in an environment in which the vehicle 100 is situated. In some embodiments, the laser rangefinder 128 may include one or more laser sources, a laser scanner, one or more detectors, and other system components.

The camera 130 may be configured to capture a plurality of images of the surrounding environment of the vehicle 100. The camera 130 may be a still camera or a video camera.

The control system 106 controls operations of the vehicle 100 and components of the vehicle 100. The control system 106 may include various elements, such as a steering system 132, a throttle 134, a brake unit 136, a sensor fusion algorithm 138, a computer vision system 140, a route control system 142, and an obstacle avoidance system 144.

The steering system 132 may be operated to adjust an advancing direction of the vehicle 100. For example, in an embodiment, the steering system 132 may be a steering wheel system.

The throttle 134 is configured to control an operation speed of the engine 118 and then control a speed of the vehicle 100.

The brake unit 136 is configured to control the vehicle 100 to decelerate, and the brake unit 136 may use friction force to retard the wheel 121. In another embodiment, the brake unit 136 may convert kinetic energy of the wheel 121 into a current. The brake unit 136 may alternatively slow down a rotational speed of the wheel 121 in another form to control the speed of the vehicle 100.

The computer vision system 140 may be operated to process and analyze the images captured by the camera 130, to identify the object and/or characteristics in the surrounding environment of the vehicle 100. The object and/or characteristics may include traffic signals, road boundaries, and obstacles. The computer vision system 140 may use an object recognition algorithm, a structure from motion (SFM) algorithm, video tracking, and other computer vision technologies. In some embodiments, the computer vision system 140 may be configured to: draw a map for an environment, track an object, estimate a speed of the object, and the like.

The route control system 142 is configured to determine a driving route for the vehicle 100. In some embodiments, the route control system 142 may determine the driving route for the vehicle 100 based on data from the sensor 138, the GPS 122, and one or more predetermined maps.

The obstacle avoidance system 144 is configured to identify, evaluate, and avoid or otherwise to bypass a potential obstacle in the environment in which the vehicle 100 is situated.

Certainly, in an instance, the control system 106 may additionally or alternatively include components other than those shown and described. Alternatively, some of the components shown above may be removed from the control system 106.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a loudspeaker 152.

In some embodiments, the peripheral device 108 provides a means for the user of the vehicle 100 to interact with the user interface 116. For example, the vehicle-mounted computer 148 may provide information for the user of the vehicle 100. The user interface 116 may further receive a user input by operating the vehicle-mounted computer 148, and the vehicle-mounted computer 148 can be operated by using a touchscreen. In another case, the peripheral device 108 may provide a means for the vehicle 100 to communicate with another in-vehicle device. For example, the microphone 150 may receive audio (for example, a voice command or another audio input) from the user of the vehicle 100. Similarly, the loudspeaker 152 may output audio to the user of the vehicle 100.

The wireless communications system 146 may wirelessly communicate with one or more devices directly or through a communications network. For example, the wireless communications system 146 may use 3G cellular communications such as code division multiple access (CDMA), global system for mobile communications (GSM), and general packet radio service (GPRS), 4G cellular communications such as long term evolution (LTE), or 5G cellular communications. The wireless communications system 146 may communicate with a wireless local area network (WLAN) by using Wi-Fi. In some embodiments, the wireless communications system 146 may directly communicate with a device by using an infrared link, Bluetooth, or the like. Other wireless protocols such as various vehicle communications systems, for example, the wireless communications system 146, may include one or more dedicated short-range communications (DSRC) devices. These devices may include vehicles and/or apparatuses at roadside stations that perform public and/or private data communications with each other.

The power supply 110 supplies power to the components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, as in some pure-electric vehicles.

Some or all of functions of the vehicle 100 are controlled by the computer system 112. The computer system 112 may include at least one processor 113, and the processor 113 executes instructions 115 stored in, for example, a non-transient computer-readable medium such as a memory 114. The computer system 112 may alternatively be a plurality of computing devices that control, in a distributed manner, individual components or subsystems of the vehicle 100.

The processor 113 may be any conventional processor, for example, a commercially available CPU. Alternatively, the processor may be a dedicated device, for example, an application specific integrated circuit (ASIC) or another hardware-based processor. Although FIG. 1 functionally illustrates the processor, the memory, and other elements of a computer 110 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer 110. Therefore, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In other aspects, some processes described herein are performed on the processor disposed inside the vehicle, while others are performed by a remote processor. The processes include necessary steps for performing a single operation.

In some embodiments, the memory 114 may include the instructions 115 (for example, program logic), and the instructions 115 may be executed by the processor 113 to perform various functions of the vehicle 100, including those functions described above. The memory 114 may also include additional instructions, including instructions to send data to, receive data from, interact with, and/or control one or more of the travel system 102, the sensor system 104, the control system 106, and the peripheral device 108.

In addition to the instructions 115, the memory 114 may also store data such as road maps, route information, a location, direction, and speed of the vehicle, data of other vehicles of this type, and other information. These pieces of information may be used by the vehicle 100 and the computer system 112 during operation of the vehicle 100 in an autonomous mode, a semi-autonomous mode, and/or a manual mode.

The user interface 116 is configured to provide information for or receive information from the user of the vehicle 100. In some embodiments, the user interface 116 may be included in one or more input/output devices in a set of the peripheral devices 108, for example, the wireless communications system 146, the vehicle-mounted computer 148, the microphone 150, and the loudspeaker 152.

The computer system 112 may control the functions of the vehicle 100 based on inputs received from various subsystems (for example, the travel system 102, the sensor system 104, and the control system 106) and the user interface 116. For example, the computer system 112 may use an input from the control system 106 to control the steering unit 132 to avoid the obstacle that is detected by the sensor system 104 and the obstacle avoidance system 144. In some embodiments, the computer system 112 may be operated to control many aspects of the vehicle 100 and the subsystems of the vehicle 100.

In some embodiments, one or more of the foregoing components may be installed separately from or associated with the vehicle 100. For example, the memory 114 may exist partially or completely separate from the vehicle 100. The foregoing components may be communicatively coupled together in a wired and/or wireless manner.

In some embodiments, the foregoing components are merely examples. In actual application, components in the foregoing modules may be added or deleted depending on an actual requirement. FIG. 1 should not be understood as any limitation on embodiments of this application.

An automated driving vehicle traveling on a road, for example, the vehicle 100, may identify an object in the surrounding environment of the vehicle 100, to determine to adjust a current speed. The object may be another vehicle, a traffic control device, or another type of object. In some examples, each identified object may be considered independently and may be used to determine the speed to be adjusted by the automated driving vehicle, based on characteristics of each object, such as a current speed of the object, an acceleration of the object, and a spacing between the object and the vehicle.

In some embodiments, the automated driving vehicle 100 or a computing device (for example, the computer system 112, the computer vision system 140, or the memory 114 in FIG. 1) associated with the automated driving vehicle 100 may predict behavior of the identified object based on the characteristics of the identified object and the status (for example, traffic, rain, or ice on a road) of the surrounding environment. In some embodiments, the identified objects depend on behavior of each other. Therefore, all the identified objects may be considered together to predict behavior of a single identified object. The vehicle 100 can adjust the speed of the vehicle 100 based on the predicted behavior of the identified object. In other words, the automated driving vehicle can determine, based on the predicted behavior of the object, that the vehicle needs to be adjusted to a specific stable state (for example, an accelerated, decelerated, or stop state). In this process, another factor may also be considered to determine the speed of the vehicle 100, for example, a horizontal location of the vehicle 100 on a road on which the vehicle 100 travels, a curvature of the road, and proximity between a static object and a dynamic object.

In addition to providing an instruction for adjusting the speed of the automated driving vehicle, the computing device may provide an instruction for modifying a steering angle of the vehicle 100, so that the automated driving vehicle follows a given track and/or maintains safe transverse and longitudinal distances from an object (for example, a car in an adjacent lane on the road) near the automated driving vehicle.

In some embodiments, the automated driving vehicle 100 or the computing device (for example, the computer system 112, the computer vision system 140, or the memory 114 in FIG. 1) associated with the automated driving vehicle 100 may further predict, based on the status of the vehicle and detected environment information, whether a road section ahead is available for automated driving, and control switching between the automated driving mode and a manual driving mode.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this application.

Figure 2:
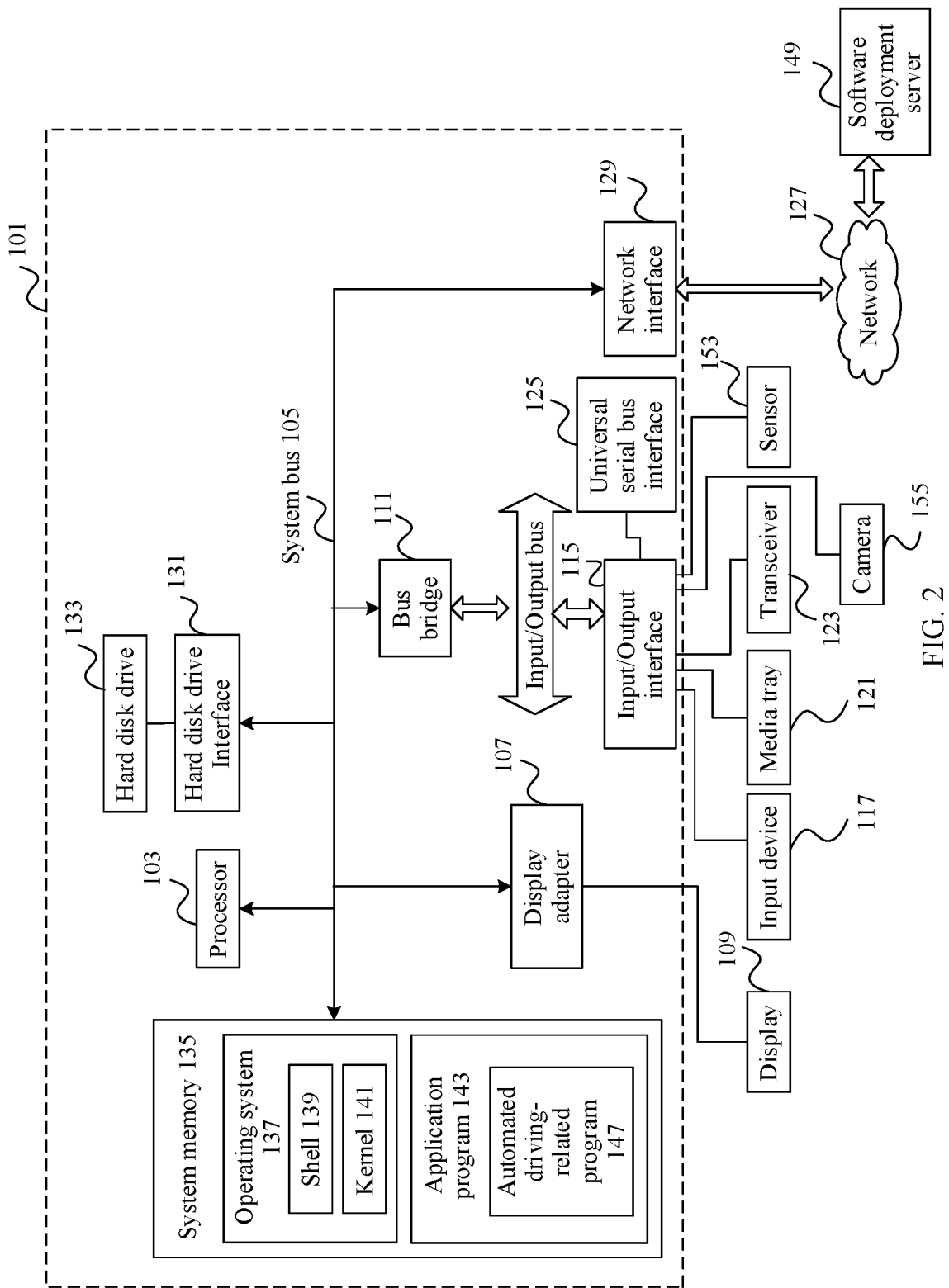
FIG. 2 is an example diagram of an automated driving system according to an embodiment of this application.

FIG. 2 is an example diagram of an automated driving system according to an embodiment of this application.

The automated driving system shown in FIG. 2 includes a computer system 101. The computer system 101 includes a processor 103, and the processor 103 is coupled to a system bus 105. The processor 103 may be one or more processors, and each processor may include one or more processor cores. A display adapter (video adapter) 107 may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, such as an input device 117 (for example, a keyboard, a mouse, or a touchscreen), a multimedia tray (media tray) 121 (for example, a compact disc read-only memory (CD-ROM) or a multimedia interface), a transceiver 123 (which may transmit and/or receive radio communications signals), a camera lens 155 (which may capture static and dynamic digital video images), and an external universal serial bus (USB) interface 125. In some embodiments, an interface connected to the I/O interface 115 may be a USB interface.

The processor 103 may be any conventional processor, for example, a reduced instruction set computer (RISC) processor, a complex instruction set computer ( ) processor, or a combination thereof. In some embodiments, the processor may be a dedicated apparatus, for example, an ASIC. The processor 103 may be a neural network processor or a combination of a neural network processor and the foregoing conventional processor.

In some embodiments, in various embodiments described in this specification, the computer system 101 may be located away from the automated driving vehicle and may wirelessly communicate with the automated driving vehicle. In other aspects, some processes described in this specification are performed on the processor disposed inside the automated driving vehicle, while others are performed by a remote processor. The processes include actions needed to perform a single operation.

The computer 101 may communicate with a software deployment server 149 through a network interface 129. The network interface 129 is a hardware network interface, for example, a network interface card. A network 127 may be an external network, for example, the Internet, or may be an internal network, for example, an Ethernet or a virtual private network (VPN). Alternatively, the network 127 may be a wireless network, for example, a Wi-Fi network or a cellular network.

A hard disk drive interface is coupled to the system bus 105. A hardware driver interface is connected to a hard disk drive. A system memory 135 is coupled to the system bus 105. Data running in the system memory 135 may include an operating system 137 and an application program 143 of the computer 101.

The operating system includes a shell 139 and a kernel 141. The shell 139 is an interface between a user and the kernel of the operating system. The shell may be the outermost layer of the operating system. The shell manages interaction between the user and the operating system:

waiting for a user input, interpreting the user input to the operating system, and processing a variety of output results of the operating system.

The kernel 141 includes components in the operating system that are configured to manage a memory, a file, a peripheral device, and a system resource. The kernel 141 directly interacts with hardware. The kernel in the operating system usually runs processes, provides communications between the processes, and provides CPU time slice management, interruption, memory management, I/O management, and the like.

The application program 143 includes related programs for controlling automated driving of the vehicle, for example, a program for managing interaction between the automated driving vehicle and a road obstacle, a program for controlling a route or the speed of the automated driving vehicle, and a program for controlling interaction between the automated driving vehicle and another automated driving vehicle on a road. The application program 143 also exists on a system of the deploying server 149. In an embodiment, the computer system 101 may download the application program 143 from the deploying server 14 when an application program 147 needs to be executed.

For example, the application program 141 may be a program for controlling the automated driving vehicle to enable or disable an automated driving assistance function.

A sensor 153 is associated with the computer system 101, and the sensor 153 is configured to detect a surrounding environment of the computer 101. For example, the sensor 153 may detect an animal, a car, an obstacle, and a crosswalk. Further, the sensor may detect environments around the foregoing objects such as the animal, the car, the obstacle, and the crosswalk, for example, an environment around the animal: another animal around the animal, a weather condition, and brightness of the surrounding environment. In some embodiments, if the computer 101 is located on the automated driving vehicle, the sensor may be a camera lens, an infrared sensor, a chemical detector, a microphone, or the like.

The computer system 112 in FIG. 1 may also receive information from or transfer information to another computer system. Alternatively, sensor data collected from the sensor system 104 of the vehicle 100 may be transferred to another computer to process the data.

Figure 3:
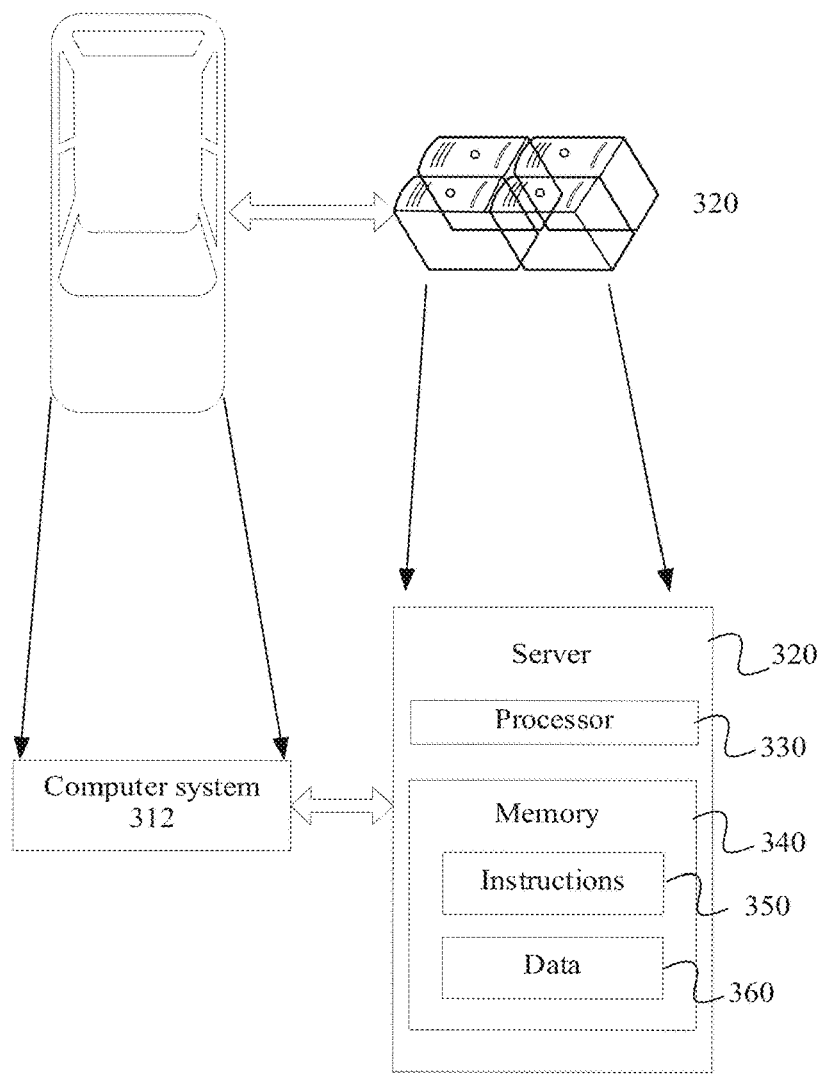
FIG. 3 is an example diagram of application of a cloud instruction-based automated driving vehicle according to an embodiment of this application.

For example, as shown in FIG. 3, data from a computer system 312 may be transmitted through a network to a cloud-side server 320 (which may also be referred to as a cloud side) for further processing. The network and intermediate nodes may include various configurations and protocols, including the Internet, the World Wide Web, an intranet, a virtual private network, a wide area network, a local area network, a private network using a proprietary communications protocol of one or more companies, an Ethernet, Wi-Fi, a hypertext transfer protocol (hyper text transfer protocol, HTTP), and various combinations thereof. Such communications may be implemented by any device capable of transmitting data to and from another computer, for example, a modem and a wireless interface. For example, data such as the status of the vehicle and the environment information is transmitted to the cloud-side server 320 for further processing. The cloud-side server may identify and process these pieces of data by using a plurality of neural network models, and feed back an identification result to the computer system 312, so that the computer system 312 can confirm whether to enable or disable the automated driving assistance function.

In an example, the server 320 may include a server having a plurality of computers, for example, a load balancing server cluster, and exchanges information with different nodes of the network to receive, process, and transmit data from the computer system 312. The server may be configured in a similar way to the computer system 312, and has a processor 330, a memory 340, instructions 350, and data 360.

The automated driving system may include several automated driving assistance functions, for example, a pre-collision system (PCS), adaptive cruise control (ACC), lane keeping assist (LKA), cross traffic alert, (CTA), rear cross traffic alert (RCTA), blind spot warning (BSW), vehicle alarm turn-off, and traffic jam assist (TJA).

With rapid development of automated driving in recent years, automated driving may be divided into a plurality of levels based on degrees of automation. Table 1 describes automated driving level classification situations provided in this embodiment of this application. It can be learned from Table 1 that, at a level equal to or lower than a level L4, a manual takeover or area-based manual driving is still a basic requirement of automated driving.

TABLE 1

| Automated driving level | | | | Driving | Peripheral | | Application |
|---|---|---|---|---|---|---|---|
| NHTSA | SAE | Name | Definition | operation | monitoring | Takeover | scenario |
| L0 | L0 | Manual driving | A driver drives a vehicle completely. | Driver | Driver | Driver | None |
| L1 | L1 | Assisted driving | A vehicle provides driving for one of a steering wheel and acceleration and deceleration, and a driver is responsible for the rest of driving actions. | Driver and vehicle | Driver | Driver | Limited scenarios |
| L2 | L2 | Partially automated driving | A vehicle provides driving for a plurality of operations among a | Vehicle | Driver | Driver | |

TABLE 1-continued

| Automated driving level | | | | Driving | Peripheral | | Application |
|---|---|---|---|---|---|---|---|
| NHTSA | SAE | Name | Definition | operation | monitoring | Takeover | scenario |
| | | | steering wheel and acceleration and deceleration, and a driver is responsible for the rest of driving actions. | | | | |
| L3 | L3 | Conditional automated driving | A vehicle completes most of driving operations, and a driver needs to stay focused in case of the unexpected. | Vehicle | Vehicle | Driver | |
| L4 | L4 | Highly automated driving | A vehicle completes all driving operations without attention of a driver, but with limited road and environmental conditions. | Vehicle | Vehicle | Vehicle | |
| | L5 | Fully automated driving | A vehicle completes all driving operations without attention of a driver. | Vehicle | Vehicle | Vehicle | All scenarios |

Only real-time detection information of a current vehicle is usually considered in an existing automated driving technology. When detecting that a dangerous situation exists in a range in front of the current vehicle, the current vehicle forcibly requires a driver to urgently take over the vehicle. Actually, however, the driver is more easily distracted during automated driving. During a manual takeover, it takes time (10 seconds or even 30 seconds on average) to recover cognition, and a risk is more likely to occur during the takeover because a response is not in time.

In view of the foregoing problem, this application provides a method for controlling vehicle driving mode switching. Based on environment information detected by a second vehicle in a target road section at a specific distance in front of a traveling direction of a first vehicle, whether the target road section is suitable for automated driving is predicted pertinently; and when the target road section is unsuitable for automated driving and the first vehicle is currently in an automated driving mode, a takeover reminder is sent to a driver of the current vehicle, to avoid that the driver is required to urgently take over the vehicle, and avoid a risk that occurs because the driver does not respond in time, thereby improving safety of automated driving.

Figure 4:
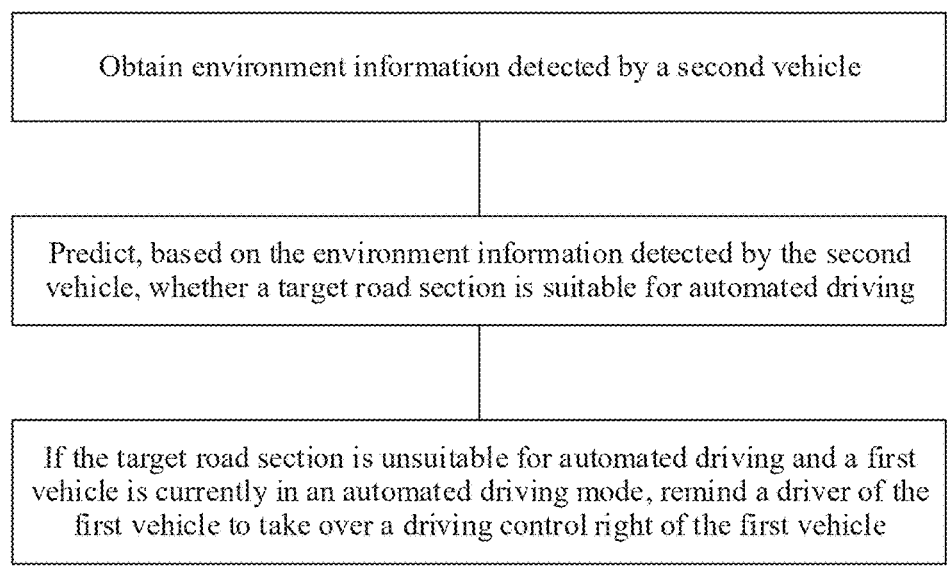
FIG. 4 is an example diagram of a method for controlling vehicle driving mode switching according to an embodiment of this application.

FIG. 4 is an example diagram of a method for controlling vehicle driving mode switching according to an embodiment of this application. The method 400 may be performed by the automated driving vehicle 100 shown in FIG. 1, the automated driving system 101 shown in FIG. 2, or the server 320 shown in FIG. 3. The method 400 includes operations S410 to S430. The following details these operations.

S410: Obtain environment information detected by a second vehicle.

It should be understood that the second vehicle is a vehicle traveling in a target road section, and the target road section is a road section located in front of a traveling direction of a first vehicle. In other words, the first vehicle has not traveled to the target road section at this time, and there is still a specific distance to the target road section.

In an example, the distance may be greater than or equal to 100 m. For example, the target road section may be 100 m away from the first vehicle, 500 m away from the first vehicle, or 1000 m away from the first vehicle. This is not limited in this application. It should be understood that the distance needs to ensure that a driver of the first vehicle has sufficient response time to take over a driving control right. In addition, a length of the target road section is not limited in this application, and may be adjusted based on a road status or weather information.

In some embodiments, the second vehicle may be a vehicle that travels in the target road section and that has a function of environment information detection, or may be a collection vehicle having the function, for example, a dedicated measurement vehicle. In some embodiments, the environment information detected by the second vehicle may be reported or sent by the second vehicle, or may be collected by another apparatus having an obtaining function.

In some embodiments, the obtaining environment information detected by a second vehicle may be obtaining environment information detected by one or more second vehicles in the target road section in front of the traveling direction of the first vehicle. This means that in this application, prediction may be made based on environment information detected by one second vehicle, or prediction may be made by comprehensively analyzing environment information detected by a plurality of second vehicles, to improve reference of a prediction result and safety of automated driving.

It should be understood that the environment information detected by the second vehicle may include a road status and/or weather information. The road status may be an obstacle condition of a road, a width of the road, a pedestrian on the road, straightness/curve of the road, a water accumulation or ice cover condition on the road, whether the road is prohibited from passing, or the like. The weather information may be visibility caused by rain, snow, fog, or the like, a temperature condition, light intensity, or the like. It should be understood that the environment information is merely an example, and does not constitute any limitation on this application. In actual application, the environment information may be determined based on actual detection information of the second vehicle.

S420: Predict, based on the environment information detected by the second vehicle, whether the target road section is suitable for automated driving.

In some embodiments, the road status and/or the weather information detected by the one or more second vehicles may be analyzed. A degree of impact of each road status or weather factor on automated driving is analyzed, that is, whether automated driving is suitable in the environment is analyzed.

In some embodiments, the method 400 further includes: generating an automated driving environment map, where the automated driving environment map is used to indicate whether a plurality of road sections located in front of the traveling direction of the first vehicle are suitable for automated driving, and the plurality of road sections include the target road section.

It should be understood that the automated driving environment map can indicate whether each of a plurality of road sections in an area or on a road in front of the traveling direction of the first vehicle is suitable for automated driving. The automated driving environment map may further include location information of the plurality of road sections. It should be understood that the automated driving environment map may be used by a plurality of vehicles within a period of time, and is continuously updated with a change in information such as an environment.

For example, if a road section is suitable for automated driving, "Yes" may be marked on the road section on the map; or if the prediction result indicates that a road section is unsuitable for automated driving, "No" is marked on the road section on the map. Alternatively, different colors may be used to represent an automated driving section and a manual driving section. In this way, an automated driving environment map of a plurality of road sections in an area is obtained. Therefore, a computer device or a server may notify, in advance based on the automated driving environment map, a driver of a vehicle that is to pass a specific road section whether the road section is suitable for automated driving, or may send the automated driving environment map to the driver, so that the driver can learn, in advance based on the map, whether each of the plurality of road sections ahead is suitable for automated driving, to make a global decision on an automated driving state on a road or in an area.

In this embodiment of this application, the automated driving environment map is generated, so that the driver can learn, in advance based on the automated driving environment map, whether the plurality of road sections in front of the traveling direction are suitable for automated driving, and then the driver can enter a preparation state or perform path planning in advance, thereby improving safety of automated driving.

In some embodiments, in this application, a driving mode of the second vehicle may be further obtained, where the driving mode is an automated driving mode or a manual driving mode; and whether the target road section is suitable for automated driving is predicted based on the driving mode of the second vehicle.

For example, a driving mode of one second vehicle in the target road section is obtained. If the driving mode is automated driving, it may be considered that the target road section is suitable for automated driving. Alternatively, driving modes of a plurality of second vehicles in the target road section are obtained. If second vehicles whose quantity is greater than or equal to a specific value among the plurality of second vehicles are in automated driving modes, it may be considered that the target road section is suitable for automated driving.

In some embodiments, the method 400 further includes: obtaining driving mode change information of the second vehicle; and predicting, based on the environment information detected by the second vehicle and the driving mode change information of the second vehicle, whether the target road section is suitable for automated driving.

It should be understood that the driving mode change information of the second vehicle in the target road section is information generated when the driving mode of the second vehicle in the target road section is changed. In some embodiments, the driving mode change information may include a changed driving mode and a change reason. The change reason is a reason why the driving mode is changed. In some embodiments, the change reason may be a weather factor (rain, snow, fog, or the like), a road factor (an obstacle, a pedestrian, a road status, or the like), a driver's cause (manual active triggering), or a vehicle's cause (a system failure or the like). This is not limited in this application. In some embodiments, the driving mode change information may further include information about a location at which the driving mode is changed.

In some embodiments, when whether the target road section is suitable for automated driving is predicted based on the environment information detected by the second vehicle and the driving mode change information of the second vehicle, if the driving mode of the second vehicle in the target road section is not changed, prediction may be made based on the environment information detected by the second vehicle. If the driving mode of the second vehicle in the target road section is changed, prediction may be made based on the driving mode change information in addition to the detected environment information, or prediction may be made based only on the driving mode change information. This is not limited in this application. For example, if the driving mode of the second vehicle is changed but the change reason is a system failure of the second vehicle, manual active triggering, or the like, prediction may be made based on the environment information detected by the second vehicle or a driving mode in a previous road section may be directly used in this case. If the change reason is the weather factor, the road factor, or the like, which is equivalent to the detected environment information, prediction may be made based only on the driving mode change information. It should be understood that, when prediction is made based on the driving mode change information, prediction information can be obtained pertinently, thereby reducing an amount of information obtained and improving prediction efficiency.

In a traveling process of the vehicle, the driving mode of the vehicle is changed for many reasons, and reasons why driving modes of different vehicles are changed may be identical or different. In addition, the change reasons have different values for reference and different effective time periods for reference by other vehicles. Therefore, in an actual prediction process, a weight and/or an effective time period of the change reason may be determined; and whether the target road section is suitable for automated driving performed by the first vehicle is predicted based on the weight and/or the effective time period of the change reason. In some embodiments, a corresponding weight may be set for one or more change reasons based on a value for reference and a degree of impact on automated driving, or these reason events may be classified based on lengths of effective time periods. Then, comprehensive analysis is performed on whether the driving mode change reason is common, whether the reason can be used for reference by other vehicles, and whether the reason can be used for reference by other vehicles in a long period of time or a short period of time. Specific examples are detailed in the following embodiments. Details are not described herein.

In some embodiments, the predicting, based on the weight and/or the effective time period of the change reason, whether the target road section is suitable for automated driving performed by the first vehicle includes: when the weight of the change reason is greater than or equal to a first threshold and/or the effective time period of the change reason is greater than or equal to a second threshold, predicting, based on the changed driving mode, whether the target road section is suitable for automated driving performed by the first vehicle.

In some embodiments, if there is one change reason, when the weight of the change reason is greater than or equal to the first threshold and/or the effective time period of the change reason is greater than or equal to the second threshold, whether the target road section is suitable for automated driving performed by the first vehicle may be predicted based on the changed driving mode. If there are a plurality of change reasons, when a weight of at least one change reason is greater than or equal to the first threshold and/or an effective time period of at least one change reason is greater than or equal to the second threshold, whether the target road section is suitable for automated driving performed by the first vehicle may be predicted based on the changed driving mode. It should be understood that the foregoing is merely an implementation, and whether the target road section is suitable for automated driving may be determined depending on an actual situation in an actual operation. This is not limited herein.

In this embodiment of this application, whether the target road section is suitable for automated driving performed by the first vehicle is predicted based on the weight and/or the effective time period of the change reason, so that degrees of impact of different change reasons on the driving mode and effective time periods of the different change reasons are fully considered in the prediction process, thereby effectively improving reference of the prediction result and safety of automated driving.

S430: If the target road section is unsuitable for automated driving and the first vehicle is currently in the automated driving mode, remind the driver of the first vehicle to take over the driving control right of the first vehicle.

It should be understood that an objective of reminding the driver of the first vehicle to take over the driving control right of the first vehicle is to enable the driving mode to be switched from the automated driving mode to the manual driving mode under the control of the driver of the first vehicle.

Figure 5:
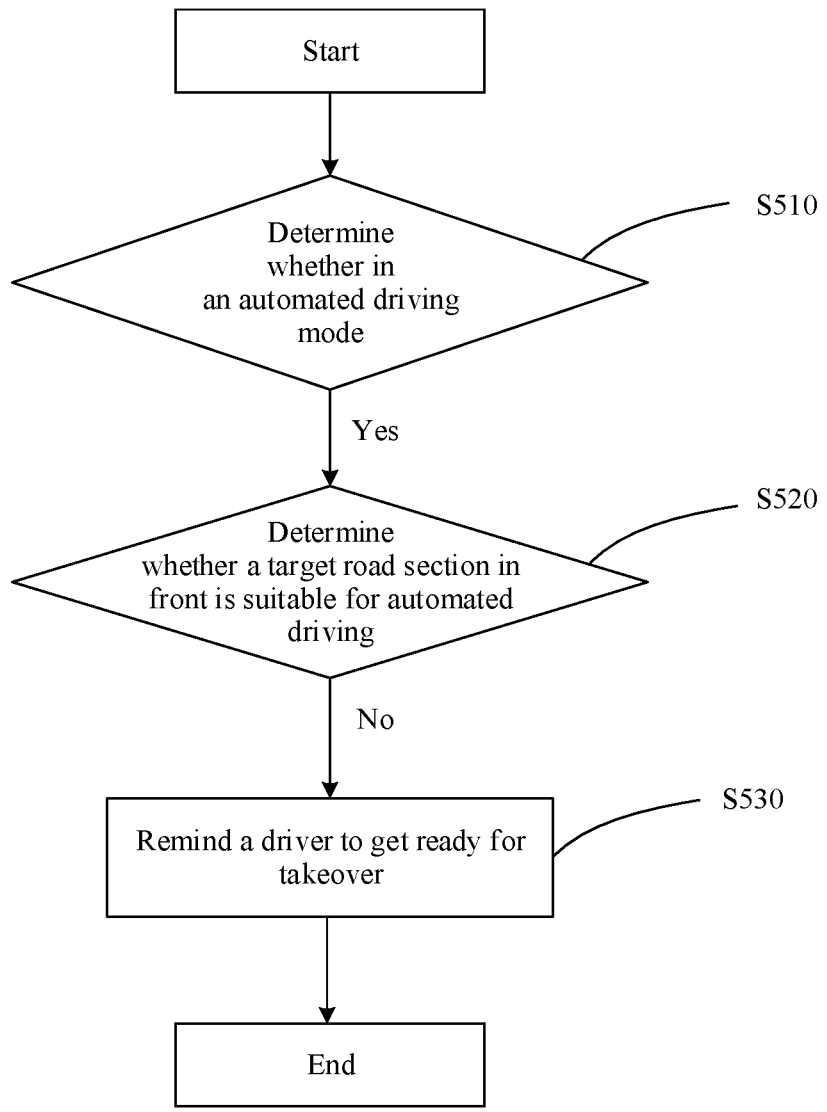
FIG. 5 is an example flowchart of a control right exchange method according to an embodiment of this application.

In some embodiments, if the target road section is unsuitable for automated driving and the first vehicle is currently in the automated driving mode, the driver of the first vehicle may be reminded to get ready to take over the driving control right of the first vehicle. For example, FIG. 5 is an example flowchart of a control right exchange method according to an embodiment of this application. As shown in FIG. 5, the method includes the following operations:

S510: Determine whether the first vehicle is currently in the automated driving mode, and if the first vehicle is in the automated driving mode, proceed to S520.

S520: Determine whether the target road section in front of the first vehicle is suitable for automated driving, and if the target road section is unsuitable for automated driving, proceed to S530.

S530: Remind the driver of the first vehicle to get ready to take over the driving control right of the first vehicle.

It should be understood that after the driver of the first vehicle is reminded to get ready to take over the driving control right of the first vehicle, automated driving can still be performed for vehicle control until manual intervention or a next takeover level is reached. To be specific, after receiving a reminder that the driver of the first vehicle needs to get ready to take over the driving control right of the first vehicle, the driver of the first vehicle may choose not to take over the driving control right of the first vehicle first, continue to drive in the automated driving mode, and take over the driving control right of the first vehicle when reaching a location that is unsuitable for automated driving. In this way, the driver of the first vehicle has a longer preparation and response time.

In some embodiments, if the target road section is unsuitable for automated driving and the first vehicle is currently in the automated driving mode, the driver of the first vehicle may be reminded to directly take over the driving control right of the first vehicle. In this case, driving safety is not affected even if a response time of the driver of the first vehicle is excessively long.

In this embodiment of this application, the environment information detected by the second vehicle in the target road section in front of the traveling direction of the first vehicle is obtained; whether the target road section is suitable for automated driving is predicted based on the environment information; and if the target road section is unsuitable for automated driving and the first vehicle is currently in the automated driving mode, the driver of the first vehicle may be reminded to take over the driving control right of the first vehicle, so that the first vehicle is switched from the automated driving mode to the manual driving mode through the takeover of the driver. In this way, in the traveling process, the automated driving vehicle can learn in advance whether the target road section ahead is suitable for automated driving. Therefore, a real-time requirement of a manual takeover during automated driving is effectively reduced, the takeover requirement is changed from a current second level to a minute level, and a specific time is provided for the driver to recover cognition before the takeover, thereby improving safety of automated driving.

In some embodiments, if the target road section is unsuitable for automated driving and the first vehicle is currently in the automated driving mode, the driver of the first vehicle may be alternatively forced to take over the driving control right of the first vehicle, to improve a sense of urgency of the driver and improve safety of automated driving.

In some embodiments, if the target road section is unsuitable for automated driving and the first vehicle is currently in the manual driving mode, the method 400 further includes: reminding the driver of the first vehicle not to switch to the automated driving mode.

In some embodiments, if the target road section is unsuitable for automated driving and the first vehicle is currently in the manual driving mode, the method 400 further includes: if the driver is activating the automated driving mode, reminding the driver of the first vehicle not to switch to the automated driving mode.

Figure 6:
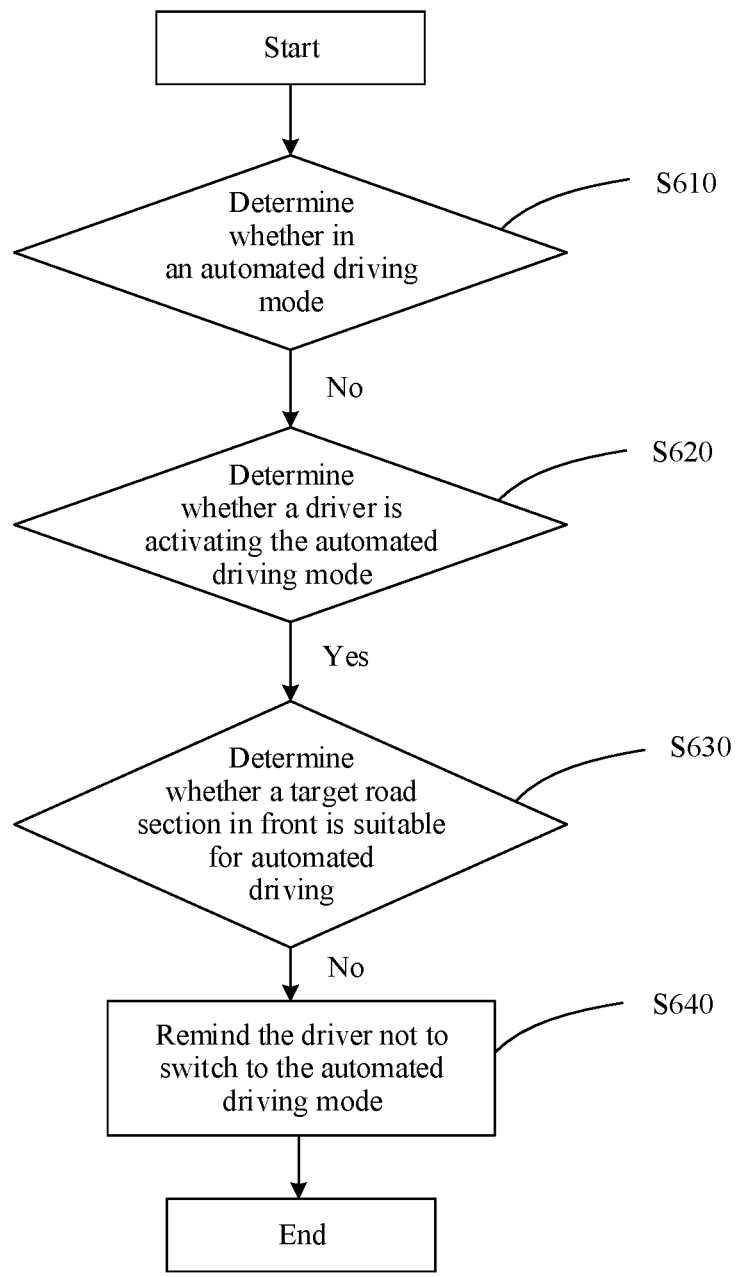
FIG. 6 is an example flowchart of another control right exchange method according to an embodiment of this application.

For example, FIG. 6 is an example flowchart of another control right exchange method according to an embodiment of this application. As shown in FIG. 6, the method includes the following operations:

S610: Determine whether the first vehicle is in the automated driving mode, and if the first vehicle is not in the automated driving mode, proceed to S620.

S620: Determine whether the driver of the first vehicle is activating the automated driving mode, and if the driver is activating the automated driving mode, proceed to S630.

S630: Determine whether the target road section in front of the first vehicle is suitable for automated driving, and if the target road section is unsuitable for automated driving, proceed to S640.

S640: Remind the driver of the first vehicle not to switch to the automated driving mode.

It should be understood that in the current manual driving mode, if the driver activates the automated driving mode, when the driver finds that the automated driving is unsuitable to be used at a specific distance ahead, the driver further needs to switch to the manual driving mode again, which causes frequent switching between automated driving and manual driving. Therefore, in this embodiment of this application, if the target road section is unsuitable for automated driving and the first vehicle is currently in the manual driving mode, the driver of the first vehicle is reminded not to switch to the automated driving mode. This effectively avoids frequent switching between driving modes in the traveling process of the vehicle, thereby ensuring continuity of automated driving and experience of the driver.

In some embodiments, if the target road section is unsuitable for automated driving and the first vehicle is currently in the manual driving mode, the first vehicle may be notified that switching from the manual driving mode to the automated driving mode is prohibited.

In some embodiments, if the target road section is unsuitable for automated driving and the first vehicle is currently in the manual driving mode, if the driver is activating the automated driving mode, the first vehicle is notified that switching from the manual driving mode to the automated driving mode is prohibited.

In this embodiment of this application, if the target road section is unsuitable for automated driving and the first vehicle is currently in the manual driving mode, the first vehicle may be notified that switching from the manual driving mode to the automated driving mode is prohibited, so that a computing system of the first vehicle makes a corresponding decision in time to prohibit switching between driving modes, thereby ensuring continuity of automated driving and experience of the driver.

In some embodiments, the foregoing process may be performed by a cloud-side service center, may be performed by another apparatus having functions such as information collection, information analysis, and information sending or by professional personnel, or may be performed by the first vehicle, and performed by a computer system of the first vehicle.

Preferably, the following describes the solutions of this application by using the cloud-side service center as an example. It should be understood that in this embodiment of this application, the cloud-side service center may also be referred to as a cloud side, and the cloud side is associated with the second vehicle and the first vehicle by using a network.

In a specific implementation, the cloud side may obtain the environment information detected by the second vehicle; predict, based on the environment information detected by the second vehicle, whether the target road section is suitable for automated driving; and if the target road section is unsuitable for automated driving and the first vehicle is currently in the automated driving mode, remind the driver of the first vehicle to take over the driving control right of the first vehicle, so that the first vehicle is switched from the automated driving mode to the manual driving mode.

In some embodiments, if the target road section is unsuitable for automated driving and the first vehicle is currently in the manual driving mode, the cloud side may remind the driver of the first vehicle not to switch to the automated driving mode; or notify the first vehicle that switching from the manual driving mode to the automated driving mode is prohibited.

In some embodiments, the cloud side may further generate an automated driving environment map, where the automated driving environment map is used to indicate whether a plurality of road sections located in front of the traveling direction of the first vehicle are suitable for automated driving, and the plurality of road sections include the target road section.

In some embodiments, the cloud side may further obtain driving mode change information of the second vehicle, where the driving mode change information includes a changed driving mode and a change reason; and predict, based on the environment information detected by the second vehicle and the driving mode change information of the second vehicle, whether the target road section is suitable for automated driving.

It should be understood that in an actual operation, the cloud side may serve a plurality of vehicles within a specific range. The cloud side may detect information from these vehicles, and may also send prompt information to these vehicles, to remind the vehicles whether a current road section or the plurality of road sections ahead are suitable for automated driving.

Figure 7:
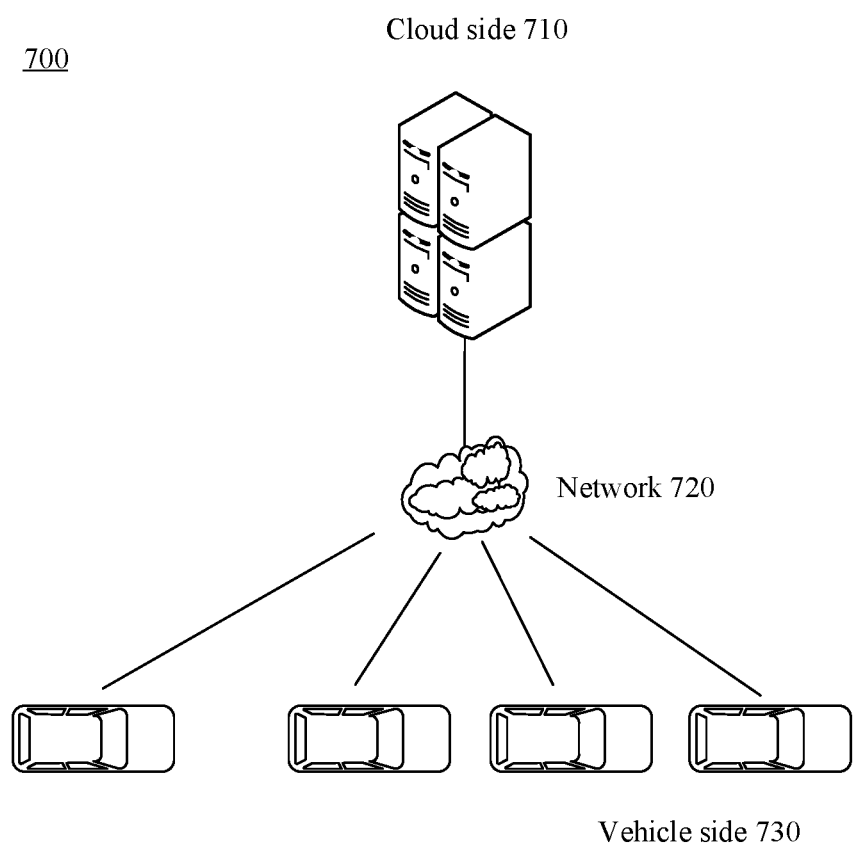
FIG. 7 is a diagram of an architecture of a vehicle-cloud collaboration system according to an embodiment of this application.

FIG. 7 is a diagram of an architecture of a vehicle-cloud collaboration system according to an embodiment of this application. As shown in FIG. 7, the system architecture includes a cloud side 710, a network 720, and a vehicle side 730.

The cloud side 710 may receive data such as sensor data from the vehicle side 730 in an operating environment of the cloud side 710 through the network 720, for example, a wireless communications network. The vehicle side 730 includes a plurality of vehicles such as the foregoing first vehicle and one or more second vehicles. The cloud side 710 runs, based on the received data, a vehicle driving-related program stored in the cloud side 710, to implement the method shown in FIG. 4. It should be understood that a direct association between the vehicle side and the cloud side may be considered as an association between a computer system and the cloud side.

In an implementation, the cloud side 710 is configured to: obtain environment information detected by the vehicle side 730 on a plurality of road sections in a driving area, and predict, based on the environment information detected by the vehicle side 730, whether the plurality of road sections in the driving area of the vehicle side 730 are suitable for automated driving. When the plurality of road sections are unsuitable for automated driving, the cloud side 710 may send prompt information to the vehicle side 730. The cloud side 710 may be further configured to generate an automated driving environment map for a road or an area through fusion based on a prediction result. The vehicle side 730 may confirm, based on the prediction result of the cloud side 710, a reminder, or the automated driving environment map, whether to manually take over a driving control right.

It should be understood that the vehicle side 730 includes the foregoing first vehicle and second vehicle. This means that in a traveling process of the first vehicle, the cloud side may predict, based on the environment information detected by the second vehicle in front of the traveling direction of the first vehicle, whether a traveling road section of the second vehicle is suitable for automated driving, and may provide a prediction result for the first vehicle that is about to travel to the road section for reference. The first vehicle may also report the environment information detected on a current traveling road section to the cloud side, so that the cloud side predicts, based on the information provided by the first vehicle, whether the current traveling road section of the first vehicle is suitable for automated driving, and may provide a prediction result for another vehicle that is about to travel to the road section for reference.

In another implementation, the cloud side 710 may alternatively predict, based on driving mode change information identified by the vehicle side 730, whether a plurality of road sections in a driving area of the vehicle side 730 are suitable for automated driving.

In some embodiments, the cloud side 710 is configured to predict, based on the driving mode change information detected by the vehicle side 730, whether the plurality of road sections in the driving area of the vehicle side 730 are suitable for automated driving. The cloud side 710 may be further configured to generate an automated driving environment map for a road or an area through fusion based on a prediction result.

The vehicle side 730 is configured to identify a change in a driving mode. The vehicle side 730 may be further configured to confirm, based on the prediction result of the cloud side 710 or a reminder, whether to manually take over a driving control right.

Figure 8:
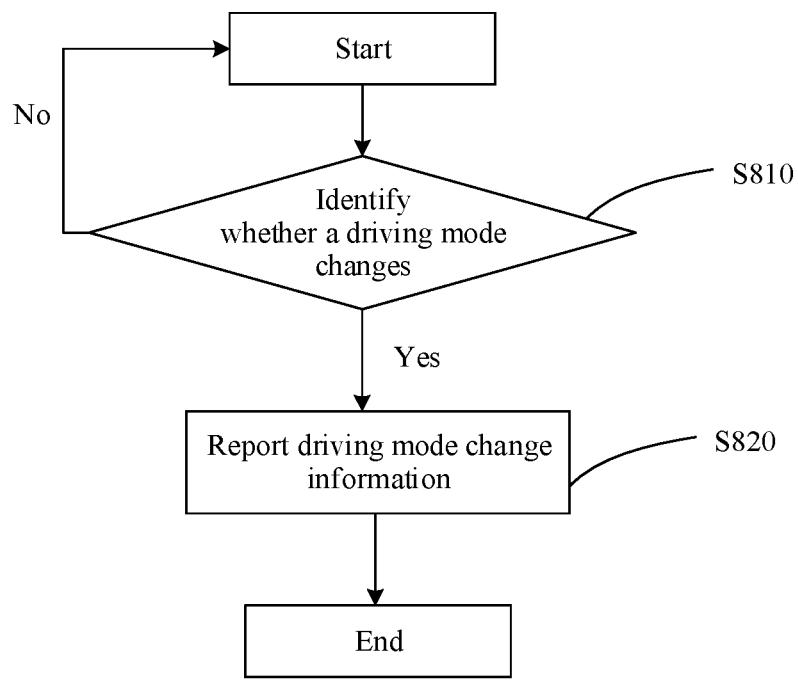
FIG. 8 is an example flowchart of reporting change information by a vehicle side according to an embodiment of this application.

The following details this implementation with reference to FIG. 8 and Table 1.

In some embodiments, when the plurality of vehicles of the vehicle side 730 travel in an area or on a road in/on which the vehicles are located, if a vehicle identifies that a driving mode of the vehicle is changed, the vehicle reports the driving mode change information to the cloud side 710. FIG. 8 is an example flowchart of reporting driving mode change information by a vehicle side according to an embodiment of this application. As shown in FIG. 8, the following operations are included: S810: The vehicle side 730 identifies whether the driving mode of the vehicle side 730 is changed, and if the driving mode of the vehicle side 730 is changed, performs operation S820. S820: Report the driving mode change information to the cloud side 710. In addition, in this embodiment, the driving mode change information may include a changed driving mode and a change reason.

Subsequently, after receiving the driving mode change information reported by the vehicle side 730, the cloud side 710 comprehensively predicts whether the plurality of road sections in which the vehicle side 730 is located are suitable for automated driving.

In some embodiments, the cloud side 710 analyzes driving mode change reasons of the vehicle side 730 together, sets corresponding weights for the change reasons based on values for reference of the change reasons and degrees of impact on automated driving, or classifies the change reasons based on lengths of effective time periods, and then predicts, based on the weights and/or the effective time periods of the change reasons, whether the plurality of road sections in which the vehicle side 730 travels are suitable for automated driving. Table 2 shows an example table of classification of different change reasons and effective time periods of the change reasons:

TABLE 2

| Change reason | Classification of effective time periods |
| --- | --- |
| Obstacles and road construction and reconstruction in front of a current lane | Applicable to all automated driving vehicles for reference within a specific period of time |
| Excessively narrow or obscure lane | |
| Excessive pedestrians | |
| Curved road section with a high curvature | |
| Low visibility caused by dense fog | |
| Slippery pavement | |
| Automated driving prohibited in a current road section | Applicable to all automated driving vehicles for reference for a long period of time |
| Sudden intrusion of a pedestrian, a vehicle, an animal, or the like | Not used by other vehicles for reference |
| System failure of a current vehicle | |
| Manual active triggering | |
| Unknown types | |

As listed in Table 2, the change reasons may be classified into three types based on the effective time periods. Change reasons of a first type are applicable to all automated driving vehicles for reference within a specific period of time, for example, changes caused by temporary obstacles, weather, and pedestrians. Change reasons of a second type are applicable to all automated driving vehicles for reference for a long time, for example, changes caused by prohibition of automated driving imposed by traffic regulations. Change reasons of a third type are not used by other vehicles for reference, for example, changes caused by a system failure of a vehicle and manual triggering.

Based on the foregoing descriptions, the cloud side 710 may set the corresponding weights for the change reasons based on the values for reference of the change reasons and the degrees of impact on automated driving, and predict, based on the weights of the change reasons, whether the plurality of road sections in which the vehicle side 730 travels are suitable for automated driving.

For example, if the vehicle driving mode is changed to a manual driving mode because obstacles or road construction and reconstruction exists in front of a current driving lane of the vehicle, the cloud side can learn, through analysis in this case, that the reason affects automated driving in a road section to some extent, and may set a weight of the reason to A, for example, 0.6. If the vehicle driving mode is changed because automated driving is prohibited in a traveling road section, the cloud side can learn, through analysis in this case, that the reason makes automated driving completely inapplicable in the road section, and may set a weight of the reason to B, for example, 1. If the vehicle driving mode is changed because of a sudden intrusion of a pedestrian, a vehicle, an animal, or the like, the cloud side can learn, through analysis in this case, that the reason does not affect automated driving performed by other vehicles, and may set a weight of the reason to C, for example, 0. In addition, when the weight that is set for the change reason is greater than or equal to a first threshold, the cloud side may further predict, based on the changed driving mode, whether the road section is suitable for automated driving. For example, in this example, when the weight that is set for the detected change reason is greater than 0.5, whether the road section is suitable for automated driving may be predicted based on the changed driving mode.

In some embodiments, the cloud side 710 may further classify the reason events based on lengths of effective time periods of the change reasons, and predict, based on the effective time periods of the change reasons, whether the plurality of road sections in which the vehicle side 730 travels are suitable for automated driving.

For example, if the vehicle driving mode is changed to the manual driving mode because obstacles or road construction and reconstruction exists in front of a driving lane, the cloud side can learn, through analysis in this case, that an effective time period in which the reason may exist is a construction period, and may set the effective time period as a short term, for example, 10 days. If the vehicle driving mode is changed because automated driving is prohibited in a traveling road section, the cloud side can learn, through analysis in this case, that the reason exists because of traffic regulations and exists for a long term, and may set an effective time period of the reason as a long term. If the vehicle driving mode is changed because of a sudden intrusion of a pedestrian, a vehicle, an animal, or the like, or the vehicle's cause, the cloud side can learn, through analysis in this case, that the reason exists because of an emergency situation or a status of the vehicle and cannot be applied to other vehicles for reference, and may set an effective time period of the reason as 0. In addition, when the specified effective time period is greater than or equal to a second threshold, the cloud side may further predict, based on the changed driving mode, whether the road section is suitable for automated driving. The second threshold may be determined depending on an actual situation, for example, may be determined based on time at which a subsequent vehicle arrives at the road section. For example, in this example, if a vehicle travels to the road section after one hour and a change reason for which an effective time period is greater than or equal to one hour exists, whether the road section is suitable for automated driving is predicted based on the changed driving mode.

In some embodiments, the cloud side 710 may further comprehensively predict, based on the weight and the effective time period of the change reason, whether the plurality of road sections in which the vehicle side 730 travels are suitable for automated driving.

It should be understood that the cloud side can analyze all data obtained within a service range. Therefore, in a road section, if no driving mode is changed, or a driving mode is changed but a change reason has no value for reference or an effective time period of the change reason is less than the second threshold, whether the road section is suitable for automated driving may be predicted based on a driving mode of a previous road section of the road section. For example, if the driving mode of the previous road section is an automated driving mode, and the driving mode on the current road section is not changed, that the current road section is suitable for automated driving can be predicted.

In still another implementation, the cloud side 710 may alternatively obtain both the environment information and the driving mode change information that are detected by the vehicle side 730, and perform prediction based on the detected environment information and the detected driving mode change information. Details are not described herein.

It should be understood that the network 720 may include various configurations and protocols, including the Internet, the World Wide Web, an intranet, a virtual private network, a wide area network, a local area network, a private network using a proprietary communications protocol of one or more companies, an Ethernet, Wi-Fi, an HTTP, and various combinations thereof. Such communications may be implemented by any device capable of transmitting data to and from another computer, for example, a modem and a wireless interface.

In an example, the cloud side 710 may include a server having a plurality of computers, for example, a load balancing server cluster. These servers may be configured in a similar way to a computer system 201 or a computer system 150, and has a processor, a memory, instructions, and the like.

Figure 9:
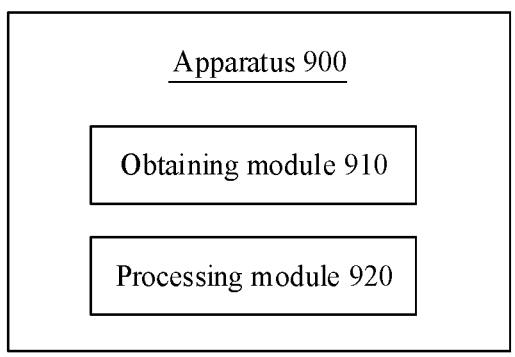
FIG. 9 is an example diagram of a structure of an apparatus for controlling vehicle driving mode switching according to an embodiment of this application.

FIG. 9 is an example diagram of a structure of an apparatus for controlling vehicle driving mode switching according to an embodiment of this application. The apparatus 900 includes an obtaining module 910 and a processing module 920.

The obtaining module 910 is configured to obtain environment information detected by a second vehicle, where the second vehicle is a vehicle traveling in a target road section, and the target road section is a road section located in front of a traveling direction of a first vehicle. The processing module 920 is configured to: predict, based on the environment information detected by the second vehicle, whether the target road section is suitable for automated driving; and if the target road section is unsuitable for automated driving and the first vehicle is currently in an automated driving mode, remind a driver of the first vehicle to take over a driving control right of the first vehicle, so that the first vehicle is switched from the automated driving mode to a manual driving mode.

In some embodiments, if the target road section is unsuitable for automated driving and the first vehicle is currently in the manual driving mode, the processing module 920 may be further configured to: remind the driver of the first vehicle not to switch to the automated driving mode; or notify the first vehicle that switching from the manual driving mode to the automated driving mode is prohibited.

In some embodiments, the processing module 920 may be further configured to generate an automated driving environment map, where the automated driving environment map is used to indicate whether a plurality of road sections located in front of the traveling direction of the first vehicle are suitable for automated driving, and the plurality of road sections include the target road section.

In some embodiments, the obtaining module 910 may be further configured to obtain driving mode change information of the second vehicle, where the driving mode change information includes a changed driving mode and a change reason. The processing module 920 may be further configured to predict, based on the environment information detected by the second vehicle and the driving mode change information of the second vehicle, whether the target road section is suitable for automated driving.

Figure 10:
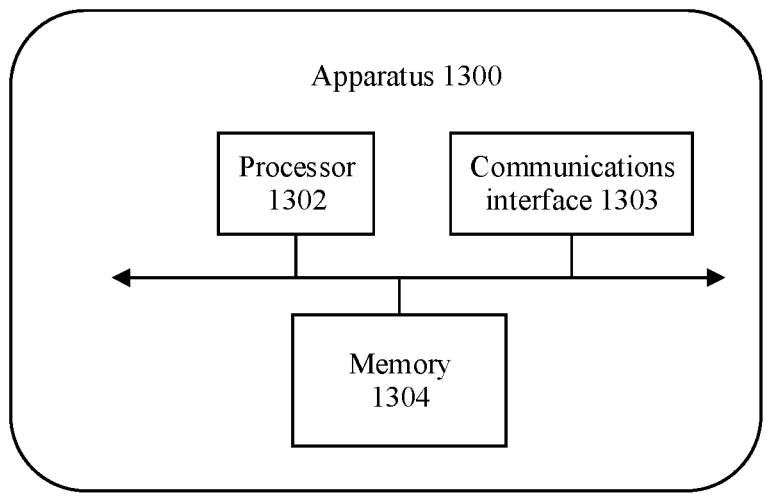
FIG. 10 is an example diagram of a structure of an apparatus according to an embodiment of this application.

FIG. 10 is an example diagram of a structure of an apparatus 1300 according to an embodiment of this application. The apparatus 1300 includes a processor 1302, a communications interface 1303, and a memory 1304. For example, the apparatus 1300 is a chip. For another example, the apparatus 1300 is a computing device.

The processor 1302, the memory 1304, and the communications interface 1303 may communicate with each other through a bus. The memory 1304 stores executable code, and the processor 1302 reads the executable code in the memory 1304 to perform a corresponding method. The memory 1304 may further include another software module needed for process running, for example, an operating system. The operating system may be Linux™, Unix™, Windows™, or the like.

For example, the executable code in the memory 1304 is used to implement the method shown in FIG. 4, and the processor 1302 reads the executable code in the memory 1304 to perform the method shown in FIG. 4.

The processor 1302 may be a CPU. The memory 1304 may include a volatile memory (volatile memory), for example, a random access memory (RAM). The memory 1304 may further include a non-volatile memory (2 NVM), for example, a read-only memory (2 ROM), a flash memory, a hard disk drive (HDD), or a solid state disk (SSD).

Figure 11:
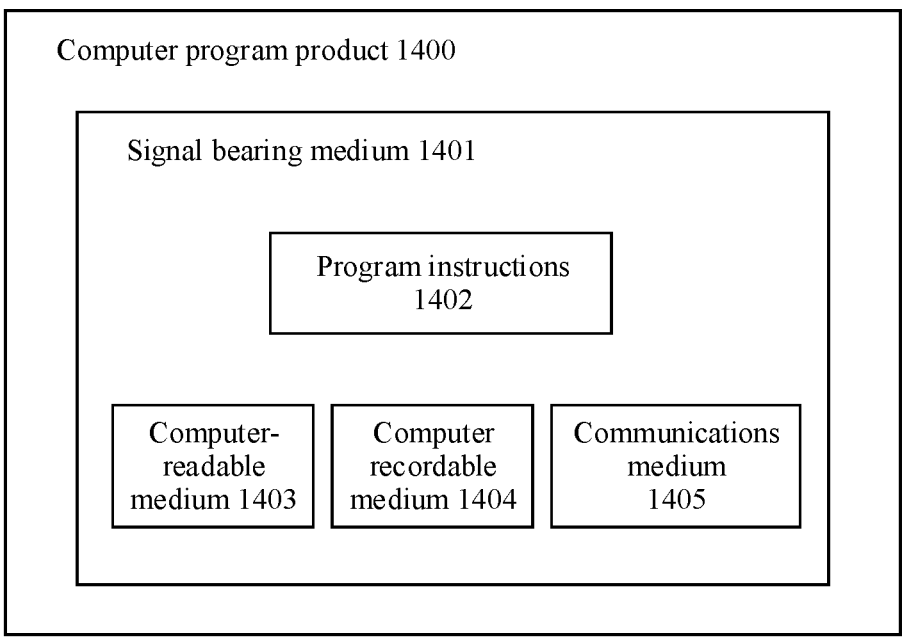
FIG. 11 is an example diagram of a computer program product according to an embodiment of this application.

In some embodiments of this application, the disclosed methods may be implemented by using computer program instructions encoded on a computer-readable storage medium in a machine readable format or encoded on another non-transitory medium or artifact. FIG. 11 schematically shows a conceptual partial view of an example computer program product arranged according to at least some embodiments described herein. The example computer program product includes a computer program for executing a computer process on a computing device. In an embodiment, the example computer program product 1400 is provided by using a signal bearing medium 1401. The signal bearing medium 1401 may include one or more program instructions 1402. When the program instructions 1402 are run by one or more processors, the foregoing functions or some of the foregoing functions described for the method shown in FIG. 4 are provided. Therefore, for example, with reference to the embodiment shown in FIG. 4, one or more features of S410 to S430 may be implemented by using one or more instructions associated with the signal bearing medium 1401.

In some examples, the signal bearing medium 1401 may include a computer-readable medium 1403, for example, but not limited to, a hard disk drive, a compact disc (CD), a digital video disc (DVD), a digital tape, a memory, a ROM, or a RAM. In some embodiments, the signal bearing medium 1401 may include a computer recordable medium 1404, for example, but not limited to, a memory, a read/write (R/W) CD, or an R/W DVD. In some embodiments, the signal bearing medium 1401 may include a communications medium 1405, for example, but not limited to, a digital and/or analog communications medium (for example, an optical-fiber cable, a waveguide, a wired communications link, or a wireless communications link). In this case, for example, the signal bearing medium 1401 may perform transmission by using a communications medium 1405 in a wireless form (for example, a wireless communications medium complying with the IEEE 802.11 standard or another transmission protocol). The one or more program instructions 1402 may be, for example, a computer executable instruction or a logical implementation instruction. In some examples, the foregoing computing device may be configured to provide various operations, functions, or actions in response to the one or more program instructions 1402 transmitted to the computing device through the computer-readable medium 1403, the computer recordable medium 1404, and/or the communications medium 1405. It should be understood that the arrangement described herein is only for an illustrative purpose. Therefore, a person skilled in the art understands that other arrangements and other elements (for example, a machine, an interface, a function, a sequence, and a functional group) can be used alternatively and some elements may be omitted depending on an expected result. In addition, many of the described elements may be implemented as discrete or distributed components, or may be functional entities implemented with reference to other components by using any suitable combination and location.

A person of ordinary skill in the art can be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It can be clearly understood by a person skilled in the art that, for the purpose of convenient and brief description, for detailed working processes of the foregoing systems, apparatuses, and units, refer to corresponding processes in the foregoing method embodiments. Details are not described herein again.

In several embodiments provided in this application, it should be understood that the disclosed systems, apparatuses, and methods may be implemented in another manner. For example, the described apparatus embodiments are merely examples. For example, unit division is merely logical function division and may be other division during actual implementation. For example, a plurality of units or components may be combined or may be integrated into another system, or some features may be ignored or not be performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units. To be specific, the parts may be located in one place, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling vehicle driving mode switching, comprising:
    obtaining environment information detected by a second vehicle, wherein the second vehicle is a vehicle traveling in a target road section located in front of a traveling direction of a first vehicle;
    obtaining driving mode change information of the second vehicle, wherein the driving mode change information comprises a changed driving mode and a change reason;
    determining at least one of a weight or an effective time period of the change reason;
    predicting, based on the environment information, the driving mode change information of the second vehicle, and the at least one of the weight or the effective time period of the change reason, whether the target road section is suitable for automated driving; and
    in response to the target road section being unsuitable for automated driving and the first vehicle being currently in an automated driving mode, reminding a driver of the first vehicle to take over a driving control right of the first vehicle, so that the first vehicle is switched from the automated driving mode to a manual driving mode.

2. The method according to claim 1, wherein in response to the target road section being unsuitable for automated driving and the first vehicle being currently in the manual driving mode, the method further comprises:
    reminding the driver of the first vehicle not to switch to the automated driving mode; or
    notifying the first vehicle that switching from the manual driving mode to the automated driving mode is prohibited.

3. The method according to claim 1, wherein the method further comprises:
    generating an automated driving environment map, wherein the automated driving environment map is used to indicate whether a plurality of road sections located in front of the traveling direction of the first vehicle are suitable for automated driving, and the plurality of road sections comprise the target road section.

4. An apparatus for controlling vehicle driving mode switching, comprising;
    at least one processor; and
    a memory coupled to the at least one processor and storing programming instructions, which when executed by the at least one processor, cause the at least one processor to perform operations, the operations comprising:
    obtaining environment information detected by a second vehicle, wherein the second vehicle is a vehicle traveling in a target road section located in front of a traveling direction of a first vehicle;
    obtaining driving mode change information of the second vehicle, wherein the driving mode change information comprises a changed driving mode and a change reason;
    determining at least one of a weight or an effective time period of the change reason;
    predicting, based on the environment information, the driving mode change information of the second vehicle, and the at least one of the weight or the effective time period of the change reason, whether the target road section is suitable for automated driving; and
    in response to the target road section being unsuitable for automated driving and the first vehicle being currently in an automated driving mode, reminding a driver of the first vehicle to take over a driving control right of the first vehicle, so that the first vehicle is switched from the automated driving mode to a manual driving mode.

5. The apparatus according to claim 4, wherein the operations further comprise:
    reminding the driver of the first vehicle not to switch to the automated driving mode; or
    notifying the first vehicle that switching from the manual driving mode to the automated driving mode is prohibited.

6. The apparatus according to claim 4, wherein the operations further comprise:
    generating an automated driving environment map, wherein the automated driving environment map is used to indicate whether a plurality of road sections located in front of the traveling direction of the first vehicle are suitable for automated driving, and the plurality of road sections comprise the target road section.

7. A non-transitory machine-readable medium having instructions stored therein, which when executed by a processor of an apparatus, cause the apparatus to perform operations comprising:
    obtaining environment information detected by a second vehicle, wherein the second vehicle is a vehicle traveling in a target road section located in front of a traveling direction of a first vehicle;
    obtaining driving mode change information of the second vehicle, wherein the driving mode change information comprises a changed driving mode and a change reason;
    determining at least one of a weight or an effective time period of the change reason;
    predicting, based on the environment information, the driving mode change information of the second vehicle, and the at least one of the weight or the effective time period of the change reason, whether the target road section is suitable for automated driving; and in response to the target road section being unsuitable for automated driving and the first vehicle being currently in an automated driving mode, reminding a driver of the first vehicle to take over a driving control right of the first vehicle, so that the first vehicle is switched from the automated driving mode to a manual driving mode.

8. The non-transitory machine-readable medium according to claim 7, wherein in response to the target road section being unsuitable for automated driving and the first vehicle being currently in the manual driving mode, the operations further comprise:
  reminding the driver of the first vehicle not to switch to the automated driving mode; or
  notifying the first vehicle that switching from the manual driving mode to the automated driving mode is prohibited.

9. The non-transitory machine-readable medium according to claim 7, wherein the operations further comprise:
  generating an automated driving environment map, wherein the automated driving environment map is used to indicate whether a plurality of road sections located in front of the traveling direction of the first vehicle are suitable for automated driving, and the plurality of road sections comprise the target road section.

* * * * *